July 22, 1941.  C. W. DARRAH ET AL  2,249,946
CAR HEATER
Filed Feb. 6, 1939  3 Sheets-Sheet 1
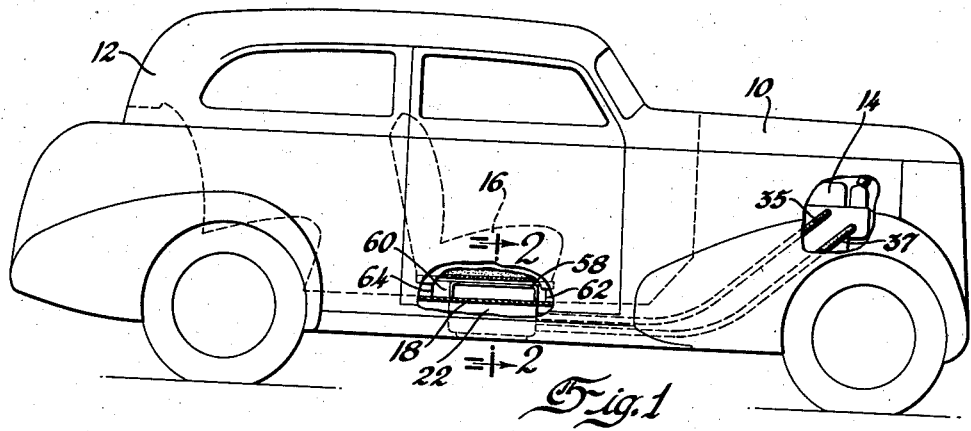
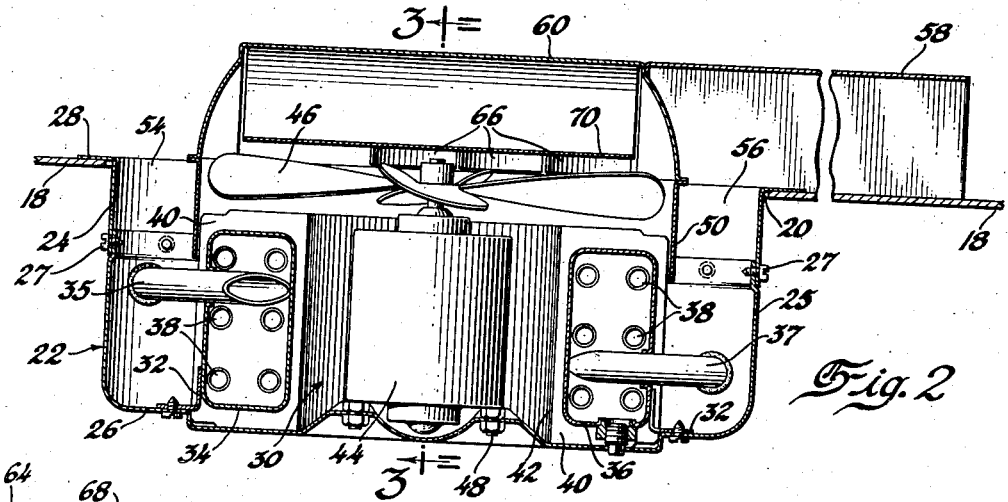
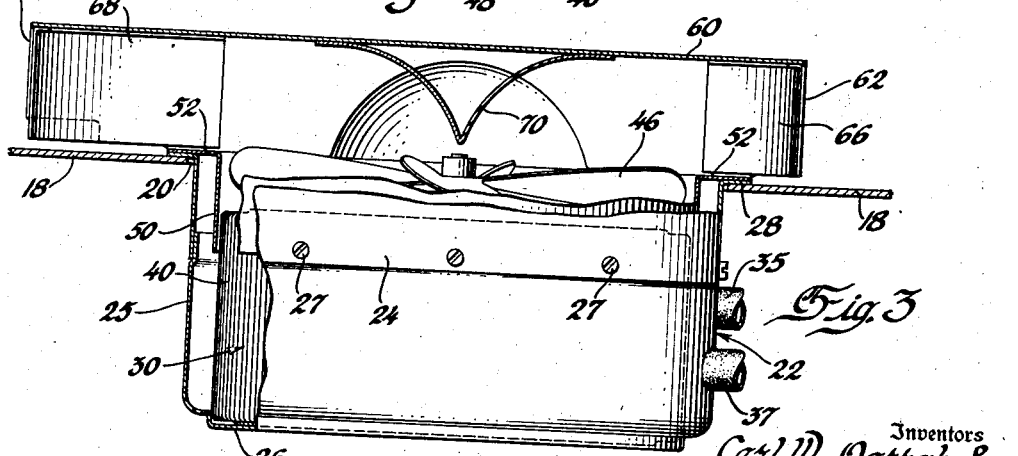
Inventors
Carl W. Darrah &
Harold A. Reynolds
By
Blackmore, Smuer & Hink
Attorneys

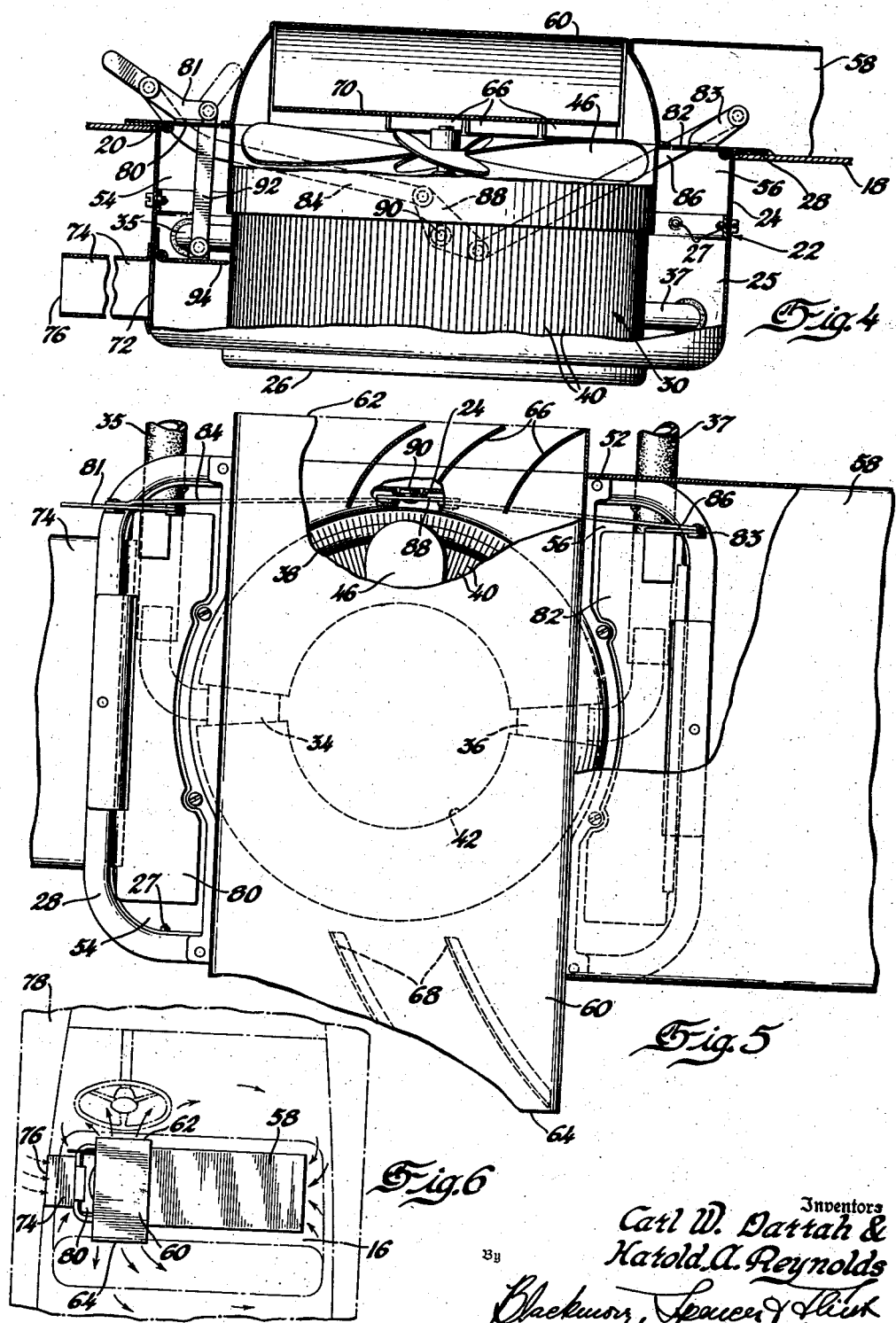

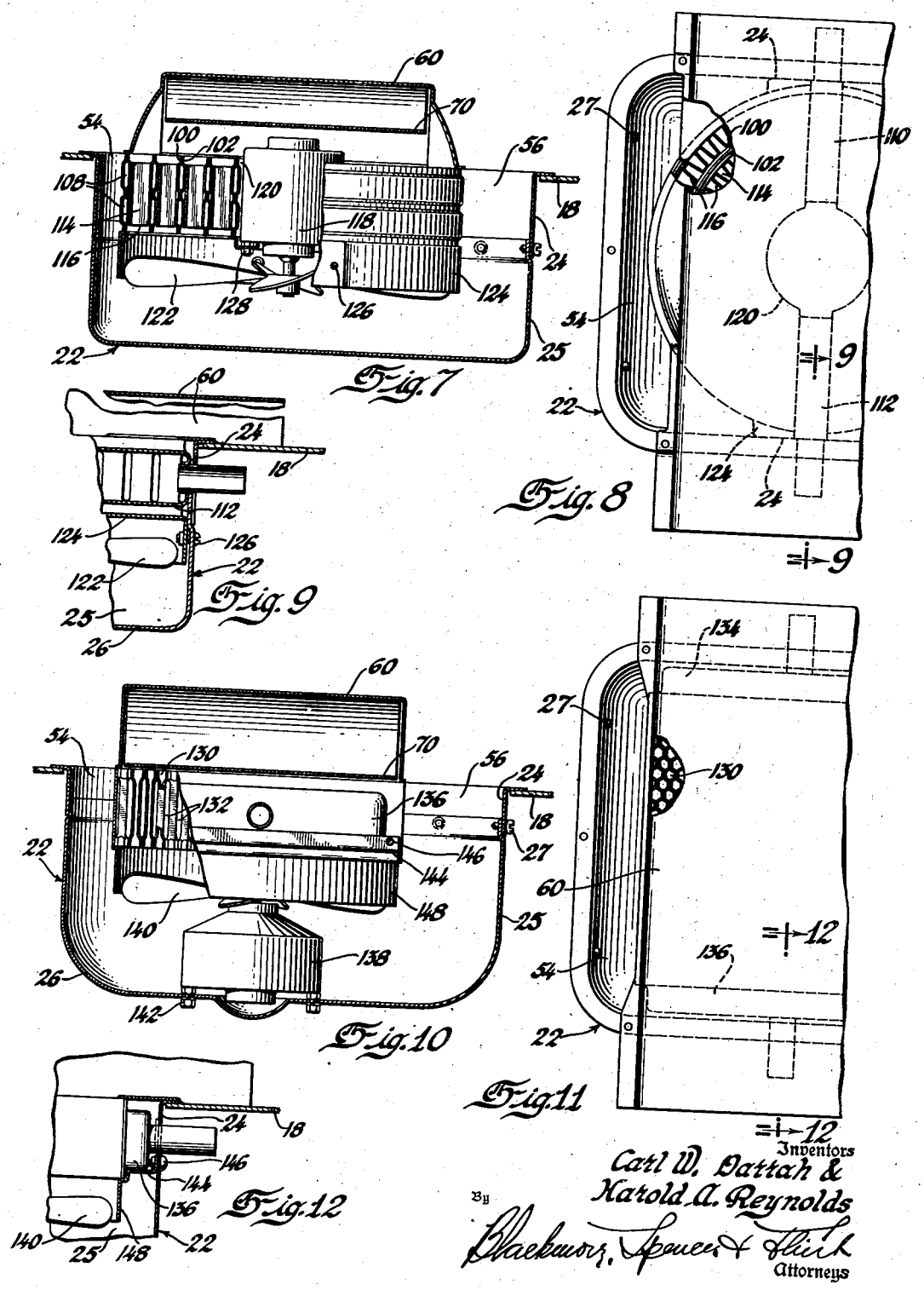

Patented July 22, 1941

2,249,946

UNITED STATES PATENT OFFICE 2,249,946

CAR HEATER

Carl W. Darrah and Harold A. Reynolds, Lockport, N. Y., assignors to General Motors Corporation, Detroit, Mich., a corporation of Delaware Application February 6, 1939, Serial No. 254,892

4 Claims. (Cl. 98—2)

This invention relates to car heaters of the type which utilize the hot water from the engine cooling circulating system as a heating medium.

One of the objects of the invention is to provide such a heater which may be located under the car floor beneath one of the vehicle seats and which will withdraw cold air from the lower portion of the car body, and after heating the air to the desired temperature, will discharge it back into the car body both in front of and behind the seat so that all portions of the space within the body will be heated uniformly.

Our improved car heater is housed in a casing which is set into an opening formed in the car floor, the top of the casing being substantially flush with the top of the floor, and the bottom extending below the floor. Provision is made for taking air into this casing from points located at opposite sides of the body immediately above the car floor and adjacent to the door openings where cold air is likely to leak into the body.

The advantages of locating the heater beneath the car floor under one of the seats are that in this position it is out of the way of the passengers, does not occupy space that would be useful for other purposes and therefore may be made as large as desired, it is easy to install, and makes it a very simple matter to heat both the space in front of and behind the seat with air taken from the coldest points in the car body. If desired, provision may be made for taking fresh air from outside the car body into the heater casing, and by an arrangement of interconnected valves which may be operated conveniently from the seat, the proportions of recirculated air and fresh outside air which pass through the heater into the car body may be varied as desired.

Other objects and advantages of the invention will be apparent upon reference to the specification and accompanying drawings, in which Fig. 1 is a side elevation of an automobile, showing our improved car heater applied thereto.

Fig. 2 is a sectional view, taken on the line 2—2 of Fig. 1.

Fig. 3 is a sectional view, taken on the line 3—3 of Fig. 2.

Fig. 4 is a view similar to Fig. 2, but showing a modified form of the invention.

Fig. 5 is a plan view of the structure shown in Fig. 4.

Fig. 6 is a plan view, on a smaller scale, of a portion of a car body, showing the heater structure illustrated in Figs. 4 and 5 applied thereto.

Fig. 7 is a view similar to Fig. 2, showing another modified form of heater.

Fig. 8 is a fragmentary plan view of the structure shown in Fig. 7.

Fig. 9 is a sectional view, taken on the line 9—9 of Fig. 8.

Fig. 10 is a view similar to Fig. 2, but showing a still differently modified form of the invention.

Fig. 11 is a fragmentary plan view of the structure illustrated in Fig. 10.

Fig. 12 is a sectional view, taken on the line 12—12 of Fig. 11.

The reference numeral 10 indicates an automobile having a body 12 and an engine 14. Located within the body is a seat 16 which may be of the well-known adjustable type which is movable forwardly or rearwardly a limited distance to suit the needs of the individual driver. The floor of the body is indicated by the numeral 18, and at one side of the longitudinal centerline of the car, preferably on the side of the driver sits on, a relatively large opening 20 is formed in the floor.

Extending through this opening is a casing 22 which is shown as being in the form of a sheet metal pan divided on a horizontal line to form upper and lower halves 24 and 25, the lower half being provided with a bottom wall 26. The two halves of the casing are secured together by fastening devices 27. Flanges 28 formed on the side walls rest on top of the floor to support the casing in the opening in the floor. Located in the casing is a heat radiating member indicated generally by the numeral 30, this member being secured to the bottom wall of the casing by the brackets 32.

The heat radiating member illustrated in this form of the invention is of the circular type, consisting of an inlet tank or header 34 and an outlet tank or header 36, connected together by water tubes 38 of arcuate shape extending through radially disposed fins 40, there being an opening 42 of circular shape in the center thereof. If desired, the water tubes 38 may be composed of nested sections formed directly from the fins, as shown in Karmazin Patent 1,761,397. A tube 35 conducts hot water from the engine cooling circulating system to the inlet header 34, and the water after flowing through the water tubes 38 around both sides of the heat radiating member, enters the outlet header 36 from which it returns to the engine through the tube 37.

An electric motor 44, adapted to drive a fan 46, is located in the central opening 42 in the heat radiating member, being supported on the bottom wall of the casing and connected thereto by bolts 48. An annular sleeve or shroud 50 extends around the fan and fits snugly over the outer upper edges of the fins 40, as shown in Figs. 2 and 3. At the front and rear sides of the shroud, as shown in Fig. 3, flanges 52 are provided on the shroud and these flanges rest on top of the flanges 28 of the casing and are secured thereto in any suitable manner such as by soldering, to support the shroud in proper position in the casing. As shown in Fig. 2, at the right and left hand sides of the casing, the shroud 50 is spaced from the casing, the spaces forming entrance passages 54 and 56 through which air may be drawn into the heater.

Since the coldest air in the body compartment is just above the floor and particularly adjacent to the door openings where cold air may leak in, it has been found desirable to take the air that is to be heated from those regions. Therefore an air intake duct 58 extends from the passage 56 to a point just inside the door on the right side of the vehicle, the end of the duct being open so that air may be drawn in through it. This duct is located under the seat above the car floor 18, the latter forming the bottom wall of the duct. Due to the fact that the heater is located at the left side of the vehicle, the passage 54 is close enough to the door so that it is not necessary to provide any duct on that side, the air being drawn directly into the passage 54.

Since it is desired to heat the spaces both in front of and behind the front seat, an outlet duct 60 is secured on top of the casing 22. This duct extends forwardly and rearwardly of the vehicle, the front end 62 terminating at a point where it will be substantially even with the front edge of the seat when the latter is adjusted back as far as it will go, and the rear end 64 of the duct 60 lying in a position where it will be substantially even with the rear face of the seat when it is adjusted as far forward as it will go. Because of the fact that the heater is located at one side of the vehicle, curved deflector members 66 and 68 are secured in the front and rear ends of the duct 60 to cause the heated air to be directed toward the opposite side of the car, so that all parts thereof will be heated uniformly. If desired, screens or grills (not shown) may be provided to cover the open ends of the duct 60, for the purpose of improving the appearance thereof. Since the air being discharged from the heater must change its direction of flow from vertical to horizontal upon entering the duct 60, a curved, substantially V-shaped diverter member 70 is secured to the underside of the top of the duct, for the purpose of smoothing out the path of the air flow.

From the above, it will be seen that when it is desired to heat the space within the car body, the electric motor 44, the speed of which may be regulated by a variable speed switch which is not shown, is started and this rotates the fan which draws cold air in from the left side of the car just above the floor through the passage 54, and from the right side of the car through the open end of the duct 58 and through the latter into the passage 56 into the heater casing 22. The cold air then flows inwardly through the spaces between the fins 40, becoming heated by contact therewith, and thence upwardly into the duct 60, where it is divided by the diverter member 70, part of the heated air being discharged through the open end 62 of the duct into the space in front of the seat and being directed toward the right side of the car by the deflector members 66, and part of it being discharged through the open end 64 of the duct into the space behind the seat where it is directed toward the right side of the body by the deflector members 68.

The advantages of this construction are that the heater structure is located in a position where it is easy to install, it does not occupy any of the passenger space or space which would be occupied by any of the vehicle parts or accessories and therefore may be made of any desired size or shape to obtain the maximum efficiency, it takes the air to be heated from immediately above the floor adjacent the door openings, which are the coldest parts of the body, and it distributes the heated air in such manner that all parts of the space within the body are heated uniformly.

The purpose of having the casing divided into upper and lower halves 24 and 25 is to make it possible to obtain access to the electric motor or heat radiating member or other parts within the casing from beneath the car, as due to the fact that the casing is located under the seat, it would be impossible to obtain access to any of these parts without removing the seat. By taking out the fastening devices 27, the lower half 25 of the casing may be dropped down, and the motor, core and other parts will come with it.

In the construction illustrated in Figs. 4, 5 and 6 a modification of the invention is shown. In this form, an opening 72 is provided in one of the side walls of the casing 22, and a duct 74 which has its outer open end 76 terminating at any suitable point such as in the side of the car immediately above the running board 78, as shown in Fig. 6, has its inner end secured to the casing, around the opening 72 and is adapted to conduct air from outside the vehicle into the casing. Such air will of course become heated as it passes through the heater before being discharged into the car through the duct 60. Since it is desirable to be able to regulate the amount of outside air being taken in, depending upon the temperature of such air, and also to regulate the proportions of recirculated air being drawn in through the passages 54 and 56 with respect to the amount of outside air being admitted, pivoted valves 80 and 82 are provided to close or partially close the passages 54 and 56 respectively. An arm 81 is secured to the valve 80, and an arm 83 to the valve 82, and these arms have pivotally connected to them links 84 and 86, the adjacent ends of which are pivotally connected to a rocker 88, which is pivotally supported at 90 on one of the side walls of the casing 22. Another link 92 is pivotally connected to the arm 81 and to a valve 94 which is pivotally secured to the casing side wall adjacent to the opening 72.

The upper end of the arm 81 is located in a position where it will be accessible to the driver or passengers sitting in the seat 16, and when it is moved to the position shown in Fig. 4, it will be seen that both the passages 54 and 56 are substantially closed by the valves 80 and 82 so that very little air may be withdrawn from the body compartment into the heater casing, and the valve 94 is in a position wherein the opening 72 is fully uncovered, so that outside air may be drawn into the casing 22, and after becoming heated will be discharged into the body. When the arm 81 is moved to the opposite position, the valves 80 and 82 will be moved to a position wherein they will uncover the openings 54 and 56, and the valve 94 will be moved to a position completely closing the opening 72. Under this condition, it will be seen that all of the air flowing through the heater is recirculated air taken from inside the car, no outside air being taken in. By moving the arm 81 to different intermediate positions, the valves 80, 82 and 94 may be adjusted to vary the proportions of recirculated air from within the body and outside air flowing through the heating device, so that any desired mixture to suit the individual preference may be obtained.

In Figs. 7, 8 and 9 another modification of the invention is shown. In this form, the heat radiating member is composed of curved water tubes formed of two sheets of metal 100 and 102 soldered or otherwise secured together at their edges and their central portions and spaced apart in between the secured together portions to form water passages 108 which communicate at their opposite ends with an inlet header 110 and an outlet header 112. The spaces in between the water tubes form air passages 114, there being zig-zag shaped fins 116 extending between and secured to the water tubes in any suitable manner such as by soldering. An electric motor 118 is located in a central opening 120 formed in the heat radiating member, and serves to drive a fan 122 which in this form of the invention is located beneath the heat radiating member. The heat radiating member is held in the casing 22 by a support 124 which is secured to two opposite side walls of the casing by fastening means 126, the motor being secured to the central portion of the support by bolts 128. The construction of the rest of the heating device and its operation are similar to those previously described, the only difference being that since the fan is below the heat radiating member, it serves to force air up through the member rather than to draw it through, as in the previously described forms.

In the form of the invention shown in Figs. 10, 11 and 12, the heat radiating member is formed of hexagon cell type of core such as is commonly used in automobile radiator constructions. In this type of core, vertically extending air passages 130 lie between transversely extending water passages 132, the opposite ends of which are connected to inlet and outlet headers 134 and 136. In this modification, both the electric motor 138 and the fan 140 are located below the heat radiating member, the motor being supported directly on the bottom wall 26 of the heater casing, being secured thereto by the bolts 142. The core is supported by a member 144 secured to the casing by fastening means 146, the lower portion 148 of the member 144 surrounding the fan and serving as a shroud therefor. In this form, the fan serves to force air upwardly through the air passages 130, otherwise the construction and operation of the rest of the device is similar to those previously described.

While we have shown and described specific forms of our invention, it will be understood that various changes in size, shape and details of construction may be made without departing from the spirit and scope of the appended claims.

We claim:

1. In a motor vehicle having a body including a floor and a seat spaced above the floor, said floor having an opening formed therein under the seat, a casing extending through said opening and below the floor, said casing having passages formed in the top thereof, a heating device located in said casing and spaced from two opposite side walls thereof, a motor driven fan located in said casing and adapted to withdraw cold air from immediately above the floor through said passages, valves located adjacent the passages and adapted to close the latter, said casing having an opening formed therein below the floor through which air from outside the body may be drawn into the casing, a valve adapted to close the opening, means connecting all of said valves together in such manner that as the valves adjacent to the passages are moved toward closed position, the valve adjacent the opening in the casing is moved toward open position so that the proportions of air being drawn into the casing from within and from without the body may be regulated, and a duct located in the space between the seat and the floor and adapted to receive the heated air discharged from the device and to conduct such air into the spaces in front of and behind the seat.

2. In a motor vehicle having a body including a floor having an opening formed therein, a casing in the form of a sheet metal pan open at its top extending through the opening, a heat radiating member supported in the casing and spaced from two opposite side walls of the casing to form air intake passages, a duct located above the floor over said member, the ends of the duct being open and the intermediate portion thereof communicating with the discharge side of said heat radiating member and a motor driven fan located in the casing and adapted to draw cold air in from the body through said passages and to force the air through the heat radiating member, the heated air being discharged through said duct back into the body.

3. In a motor vehicle having a body including a floor having an opening formed therein, a casing in the form of a sheet metal pan open at its top extending through the opening, a heat radiating member supported in the casing and spaced from two opposite side walls of the casing to form air intake passages communicating with the interior of the body, one of the side walls of the casing having an opening formed in it through which air from outside the body may enter the casing, a motor driven fan located in the casing and adapted to draw air into the casing either from the inside of the body through said passages or from outside the body through said opening and to force the air through the heat radiating member, the heated air being discharged into the space within the body, and means adapted to selectively open or close either said passages or said opening to vary the proportions of recirculated or outside air passing through the heat radiating member.

4. In a motor vehicle having a body including a floor and a seat spaced above the floor, said floor having an opening formed therein under the seat at one side thereof, a casing in the form of a sheet metal pan open at its top extending through the opening, a heat radiating member supported in the casing and spaced from two opposite side walls of the casing to form air intake passages communicating with the interior of the body, a duct located in the space between the seat and the floor leading from one of said passages to a point adjacent the opposite end of the seat, a motor driven fan located in the casing and adapted to draw cold air into the casing through the duct and the passages and to force such air through the heat radiating member, and a second duct located in the space between the seat and the floor, the heated air being discharged into said second duct and distributed by it into the spaces in front of and behind the seat.

CARL W. DARRAH.
HAROLD A. REYNOLDS.